3,547,577
REFUSE STERILIZATION SYSTEM
Charles L. Lovercheck, Erie, Pa., assignor to American Sterilizer Company, Erie, Pa., a corporation of Pennsylvania
Filed Nov. 12, 1968, Ser. No. 775,092
Int. Cl. A61l 11/00, 3/00; B30b 9/00
U.S. Cl. 21—61           2 Claims

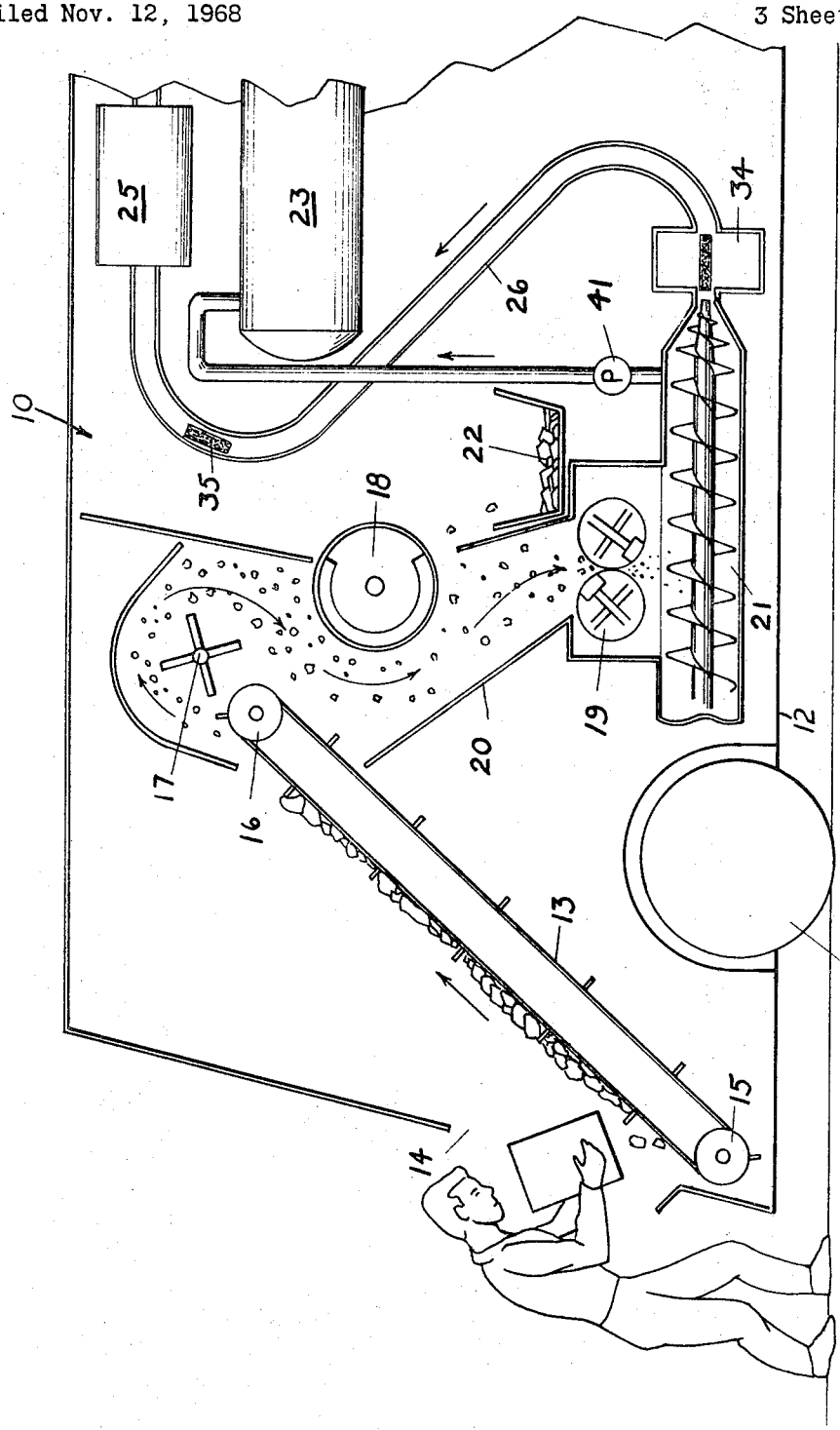

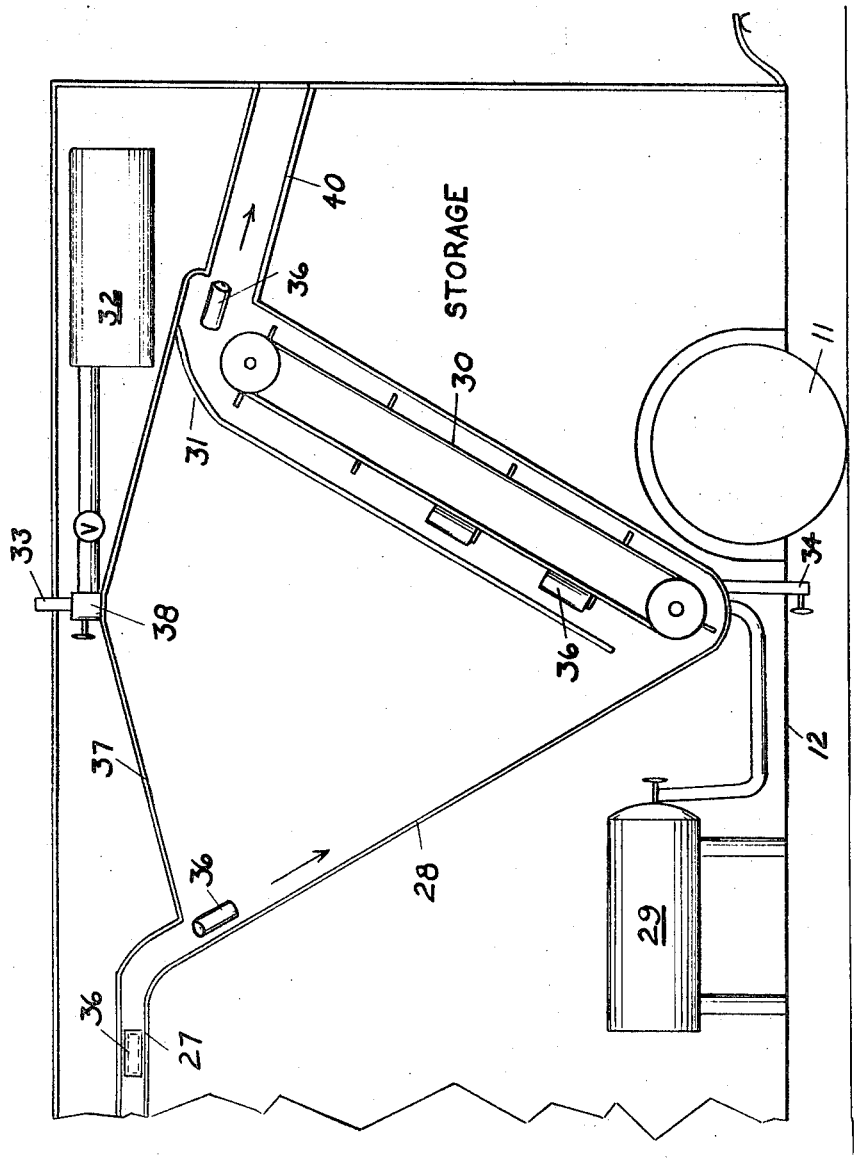

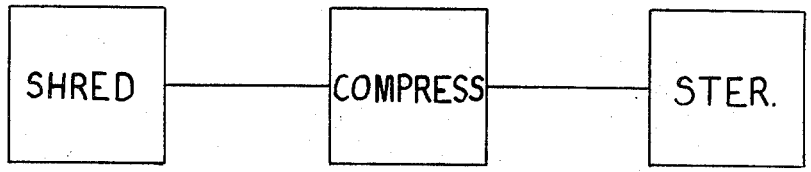
I      FIG. 3
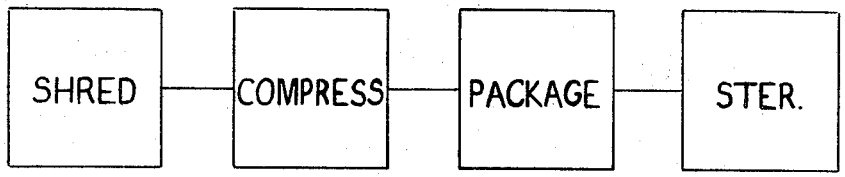
II      FIG. 4
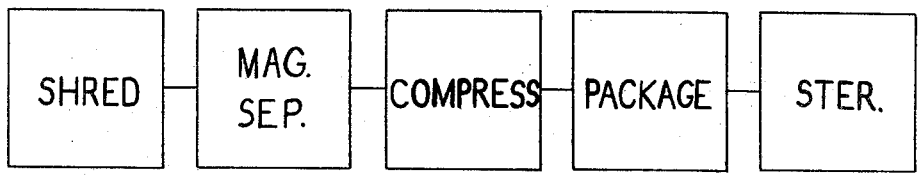
III      FIG. 5
INVENTOR
CHARLES L. LOVERCHECK

United States Patent Office 3,547,577
Patented Dec. 15, 1970

ABSTRACT OF THE DISCLOSURE

A machine for treating material such as trash, garbage, domestic refuse and the like, wherein the material is disintegrated, compressed and sterilized. As an alternative, the material may be packaged in bags made of semipermeable material before it is sterilized. The sterilizing is carried out by means of gas, such as ethylene oxide. The entire device is portable.

---

This invention relates to machines for treating refuse and more particularly to machines for treating materials such as trash, waste paper, domestic garbage and the like.

PREFERENCE TO OTHER PATENT APPLICATIONS

This invention utilizes a sterilizing device, such as shown in patent application, Ser. No. 690,304, of Charles E. Gallagher.

PRIOR ART

Various efforts have been made to provide machines for treating garbage and similar waste materials; exemplary of which is Pat. No. 1,977,644 on a lettuce waste handling machine. In each of these machines, the waste material contained harmful micro-organisms that would pollute rivers, streams, lakes, and other bodies of water where they were deposited. The waste materials also constitute a hazard to health, and if the waste material is incinerated, it becomes an air pollutant.

Applicant has discovered by packaging and sterilizing the garbage and waste material, it can be safely handled and used as sanitary fill or can be transported to a suitable repository for storage or incineration. It is also in a suitable form for repulverization and use as fertilizer.

OBJECTS OF THE INVENTION

It is, accordingly, an object of the invention to provide an improved machine for handling and sterilizing refuse including garbage and domestic waste.

Another object of the invention is to provide a machine for compressing, packaging and sterilizing garbage and waste material.

Another object of the invention is to provide an improved machine for handling waste material to prevent contamination of its environment.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:
FIG. 1 is a schematic view of the rear portion of a refuse handling machine according to the invention;
FIG. 2 is a schematic view of a forward portion of the machine shown in FIG. 1;
FIGS. 3, 4, and 5 show flow diagrams of the handling and processing of waste materials according to the invention.

Now with more particular reference to the drawings, the machine is shown mounted on a truck 10 that has wheels 11 and a frame 12. The operator may empty garbage, refuse and other waste material into the opening 14 at the rear of the vehicle onto the conveyor 13. The conveyor 13 has a suitable conveyor belt having flights on it as indicated and supported on pulleys 15 and 16. These pulleys will be driven by a suitable motor arrangement.

The subject material passes over the disintegrator 17 where it is torn apart and dropped onto the magnetic roll 18. The magnetic roll 18 may be made of any suitable design, for example, such as the permanent magnet roll shown in Pat. No. 3,168,464 which issued to James J. Ferris et al. on Feb. 2, 1965, and is assigned to Eriez Manufacturing Company.

The refuse material when passing over the drum will have any entrained ferrous material, such as tin cans and the like, transferred into the repository 22 and the nonferrous material will pass through the distintegrating rolls 19 where the garbage and refuse material will be finely pulverized. These disintegrating rolls 19 may be of a suitable type such as frequently referred to as "hammermills," wherein hammers rotating at relatively high velocity disintegrate and pulverize the material.

The disintegrated material is forced through a tapered tube as indicated at 21 and it may pass through a heater 34 which may be heated with steam or electricity or the like to heat the briquetted material shown. Water squeezed from the refuse is forced into tank 23. The briquette shown at 35 passes through the conveyor 26 to the packaging unit 25. The packaging unit 25 may be made, for example, in accordance with Pat. Nos. 3,210,-910 and 3,277,628, and from the packaging unit, the packaged briquettes indicated at 36 will pass through conveyor 27 into the tank 28. It will be noted that the tank 28 has sides that diverge upwardly and has a cover on it. Gas, such as ethylene oxide, propylene oxide, methyl bromide, betapropiolactone, and other microbicidal gases under pressure, may be admitted from tank 29 to the bottom of tank 28 where the ethylene oxide will cause air in the tank to be exhausted and floated up through the exhaust port 33. When the air has been displaced from the tank, the valve 38 may be closed.

It is desirable that the briquettes 36 in the tank 28 be maintained at a temperature of, for example, about 130° F. since the lower temperatures in the sterilizing process will require a considerably longer time and if it is necessary to supply additional heat to the briquettes to maintain approximately this temperature, the heat may be supplied by means of steam from the tank 32 or other suitable means can be provided to heat the outside of the tank 28 and its contents.

The techniques of sterilizing the materials in the tank 28 are completely described in the patent application of Charles E. Gallagher referred to herein.

When the sterilizing process has been completed in the tank 28 either during the time the material is being transported or during a suitable waiting period, the conveyor 30 is started and will carry the briquettes 36 below the baffle 31 and through the discharge chute 40, where they will be discharged to a suitable repository. The water from tank 23 may also be drained in a suitable repository.

The pump 41 may be used to fill the tank 23 if the tank is supported at a higher level than the extruder 21. The tank may be supported in the space shown in front of the extruder 21, however, if desired.

The diagrams shown in FIGS. 3, 4, and 5 indicate that certain steps of the process can be deleted if desired. For example, the material can be shredded, compressed, and sterilized deleting the packaging and magnetic separation. As an alternative, the material could be shredded, compressed, packaged, and sterilized. Alternatively, it could be shredded, the magnetic materials removed from it, the remaining materials compressed and packaged and then sterilized.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An apparatus for treating refuse materials from homes and the like comprising;
   a wheeled vehicle,
   a shredding member mounted on said vehicle,
   feeding means mounted on said vehicle to deliver said material to said shredding member,
   a compressor mounted on said vehicle to compact said material after it has been shredded and to form said material into integral bodies,
   a tank mounted on said vehicle adapted to receive said integral bodies, said tank having sides which diverge from the bottom toward the top of said tank,
   means mounted on said vehicle to package said bodies before said bodies are discharged into said tank,
   means connected to the bottom of said tank to admit a heavier-than-air microbiocidal gas into said tank at the bottom thereof whereby said bodies are exposed to said gas and microorganisms in said bodies are destroyed,
   and vent means connected to the top of said tank to discharge air displaced by said gas.

2. The apparatus of claim 1 wherein heating means is provided on said vehicle for heating said bodies while said bodies are disposed in said tank.

References Cited

UNITED STATES PATENTS

| | | | |
|---|---|---|---|
| 1,532,289 | 9/1920 | Lelean | 21—94 |
| 2,594,054 | 4/1952 | McNamara et al. | 100—96X |
| 2,965,936 | 12/1960 | Kaye | 21—91 |
| 3,093,242 | 6/1963 | Hayck et al. | 21—91UX |
| 3,189,286 | 6/1965 | O'Connor | 100—97X |
| 3,330,088 | 7/1967 | Dunlea | 53—24 |
| 3,355,044 | 11/1967 | Nelson | 100—100UX |
| 3,384,007 | 5/1968 | Boje et al. | 100—229AUX |
| 3,426,673 | 2/1969 | Miner et al. | 100—97X |
| 3,451,185 | 6/1969 | Tezuka | 53—22 |
| 3,481,268 | 12/1969 | Price et al. | 100—229AUX |

MORRIS O. WOLK, Primary Examiner

B. S. RICHMAN, Assistant Examiner

U.S. Cl. X.R.

21—58, 91, 92, 93; 53—22; 100—70, 97, 100, 117